(12) United States Patent
Adams et al.

(10) Patent No.: US 7,346,802 B2
(45) Date of Patent: Mar. 18, 2008

(54) ROUTING COMMUNICATIONS TO A STORAGE AREA NETWORK

(75) Inventors: Aland B. Adams, Fort Collins, CO (US); Michael L. Ziegler, Campbell, CA (US); Bo Quan, Fort Collins, CO (US); Scott Greenidge, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/769,371

(22) Filed: Jan. 30, 2004

(65) Prior Publication Data

US 2005/0188243 A1 Aug. 25, 2005

(51) Int. Cl.
*G06F 11/00* (2006.01)
(52) U.S. Cl. .......................................... 714/4; 370/351
(58) Field of Classification Search ..................... 714/4, 714/5, 46; 370/351, 356; 709/238
See application file for complete search history.

(56) References Cited

U.S. PATENT DOCUMENTS

| 6,154,850 | A | 11/2000 | Idleman et al. | |
|---|---|---|---|---|
| 6,460,113 | B1 * | 10/2002 | Schubert et al. | 711/111 |
| 6,529,499 | B1 * | 3/2003 | Doshi et al. | 370/352 |
| 6,640,278 | B1 * | 10/2003 | Nolan et al. | 711/6 |
| 6,665,812 | B1 | 12/2003 | Blumenau et al. | |
| 6,948,092 | B2 * | 9/2005 | Kondo et al. | 714/12 |
| 6,983,303 | B2 * | 1/2006 | Pellegrino et al. | 709/203 |
| 2002/0133629 | A1 * | 9/2002 | Jones et al. | 709/249 |
| 2003/0145045 | A1 * | 7/2003 | Pelligrino et al. | 709/203 |
| 2005/0010682 | A1 * | 1/2005 | Amir et al. | 709/238 |
| 2005/0129005 | A1 * | 6/2005 | Srikrishna et al. | 370/356 |
| 2005/0175341 | A1 * | 8/2005 | Ovadia | 398/43 |

* cited by examiner

*Primary Examiner*—Dieu-Minh Le

(57) ABSTRACT

Systems, methods, and machine-readable media are disclosed for routing communications to a storage area network (SAN). In one embodiment, the machine-readable media includes first program code to determine a route path through a gateway to a SAN for each of a plurality of addresses of an interface of a server. The first program code determines the route path by applying an algorithm to one or more numerical values associated with the address. The machine-readable media includes second program code to configure the gateway with the route paths.

20 Claims, 5 Drawing Sheets

ROUTING COMMUNICATIONS TO A STORAGE AREA NETWORK

BACKGROUND

Storage devices (e.g., disk arrays) may be accessible by a server over a network, such as a storage area network (SAN). The server's connection to the storage device may rely on the availability of a variety of components. By way of example, these components may include interfaces of the server (typically interface cards), gateways to the network, and switches.

Failure of any of the components that are used to create the connection between the server and the storage device(s) may result in loss of access to one or more storage devices on the network. Data transfers that are scheduled to take place (e.g., backups) may be disrupted. The device(s) may remain unavailable until a new path to the device is manually established or the failed component is replaced.

Even while the components remain operational, the network on which the storage device(s) reside may exhibit poor performance during heavy traffic periods. The network connections from server(s) to storage device(s) may have one or more bottlenecks in which all communications are routed through a single component, such as a switch. The component at the bottleneck point must be responsible for the entire communication load between the server(s) and storage device(s).

SUMMARY

In one embodiment, at least one machine-readable media including program code for routing communications to a storage area network (SAN) is disclosed. The machine-readable media comprises first program code to determine a route path through a gateway to a SAN for a plurality of addresses of an interface of a server. The first program code determines the route path by applying an algorithm to one or more numerical values associated with the address. The machine-readable media also comprises second program code to configure the gateway with the route paths.

BRIEF DESCRIPTION OF THE DRAWINGS

Illustrative embodiments of the invention are illustrated in the drawings in which.

DETAILED DESCRIPTION

Figure 1:
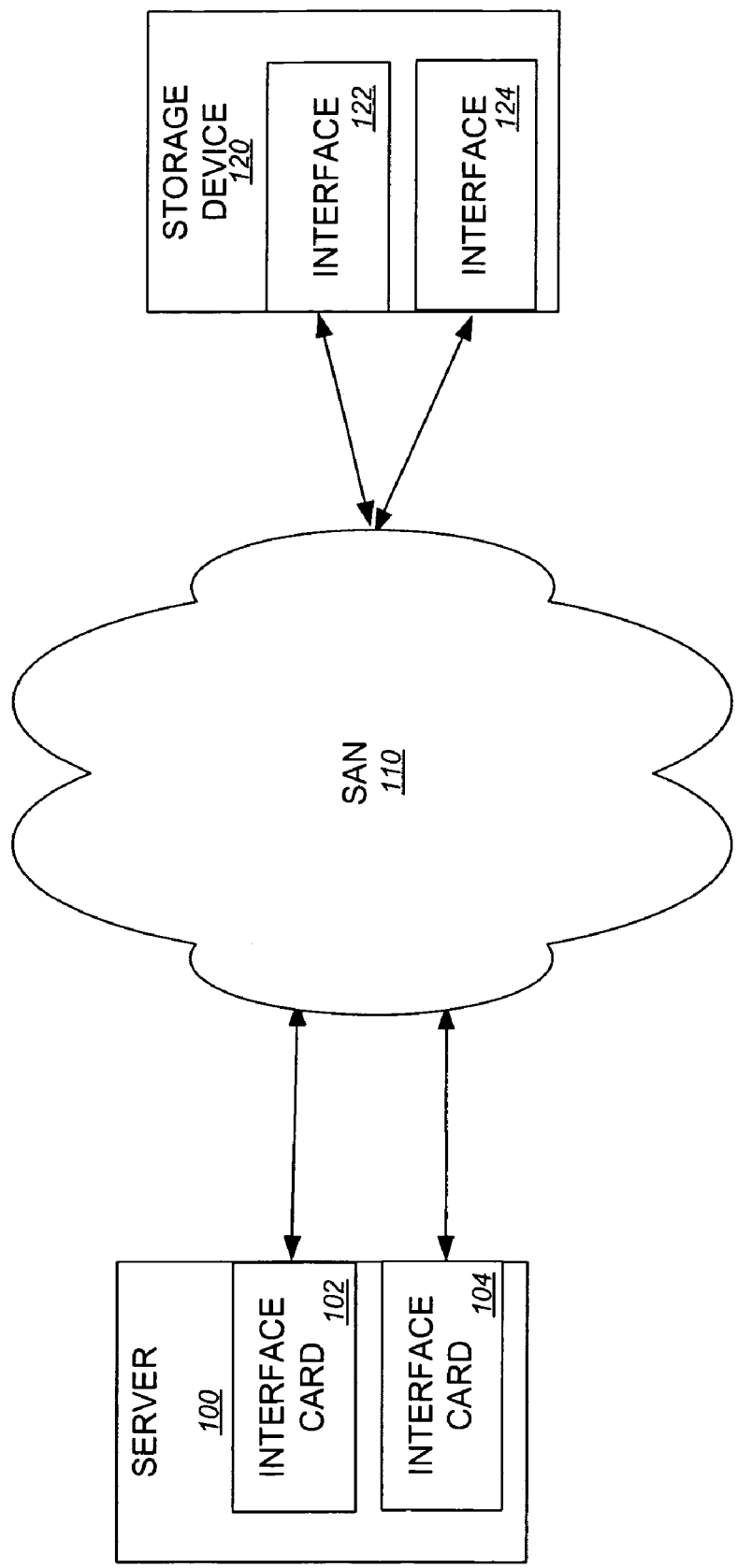
FIG. 1 illustrates an exemplary network configuration between a server and a storage device.

An exemplary configuration that may be used to route network communications to and from storage device(s) on a storage area network (SAN) is illustrated in FIG. 1. The system includes a server 100. Server 100 may be a computer or other type of machine that issues and receives communications to one or more storage devices on a SAN. The server includes two interfaces 102, 104. By way of example, the interfaces 102, 104 may comprise Small Computer Systems Interface (SCSI) cards. It is contemplated that other communication protocols, such as Internet SCSI (iSCSI) may also be used by the interfaces.

The interface cards are communicatively coupled to a SAN 110. In one embodiment, the SAN 110 may be a Fibre Channel network. Network communications may be routed through the SAN to a storage device 120. Storage device 120 may be a disk device (e.g., disk array, optical disk library), a tape device (e.g., robotic tape library) or other type of data storage device. It should be appreciated that additional storage devices may be coupled to the SAN and accessed by Server 100. It should also be appreciated that additional servers may be coupled to the SAN to access the storage device 120.

The storage device 120 includes two interfaces 122, 124 which are communicatively coupled to the SAN 110. By way of example, interfaces 122, 124 may be Fibre Channel ports. These interfaces 122, 124 may be used to send communications to and from storage device 120. Each interface 102, 104 of server 100 is able to access both interfaces 122, 124 of the storage device 120. Routing both interfaces 102, 104 of server 100 to both interfaces 122, 124 of storage device 120 may provide for automatic failover recovery in the event of failure of either interface 102, 104, either interface 122, 124, or the communication connection between these components.

As will be described in further detail below, the communications from each interface 102, 104 may be routed through different components of the SAN 110. Thus, communications between the server 100 and the storage device 120 may not be interrupted by failure of one or more components that are used to make the communication connection. Additionally, the communication load may be balanced between multiple components.

Figure 2:
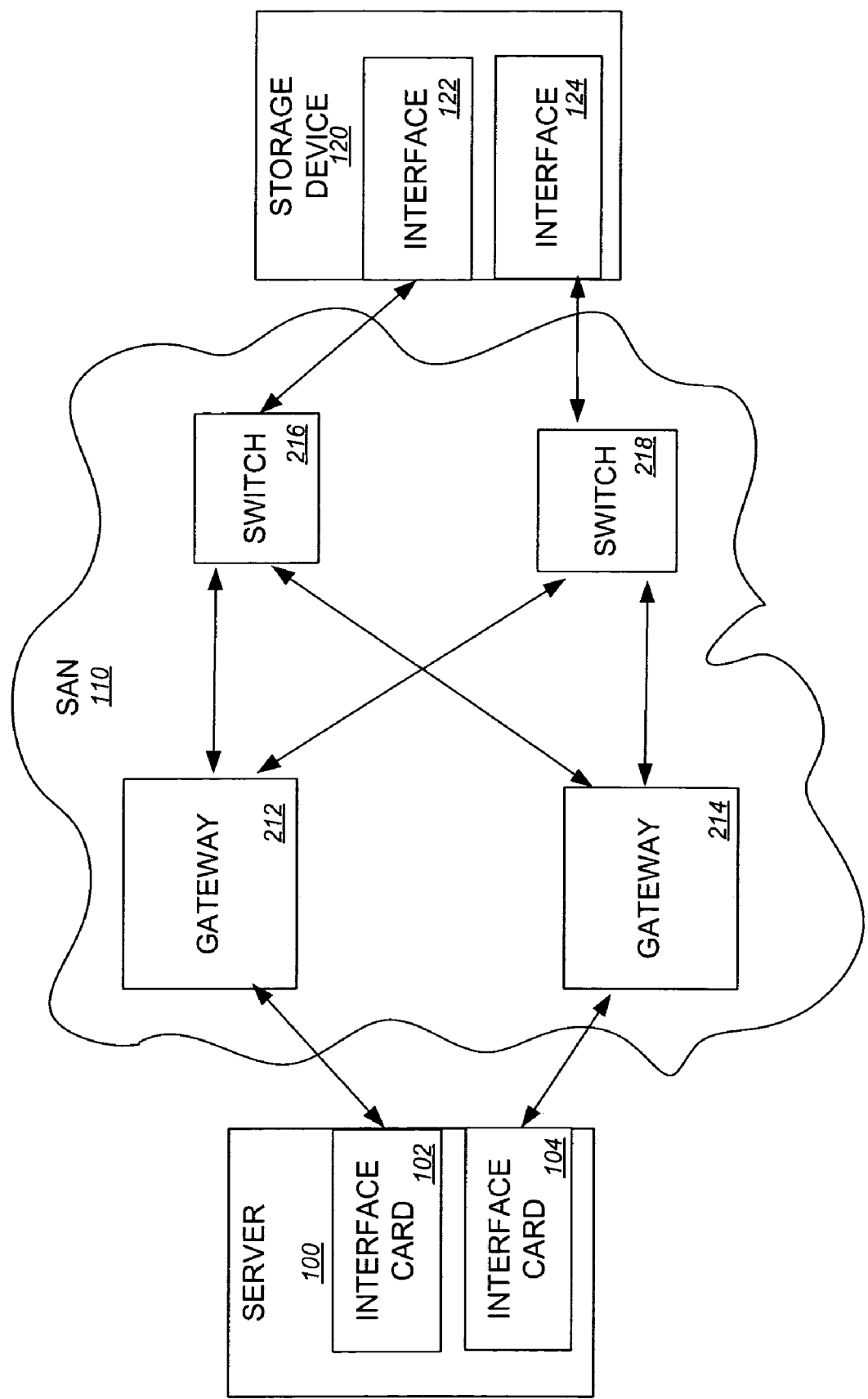
FIG. 2 illustrates an exemplary embodiment of the storage area network of FIG. 1.

FIG. 2 illustrates an exemplary embodiment of the SAN 110 of FIG. 1. The SAN includes two gateways 212, 214. Gateway 212 is communicatively coupled to interface 102 and gateway 214 is communicatively coupled to interface 104. By way of example, the communication connection between the gateways 212, 214 and their respective interfaces 102, 104 may be via SCSI cables. Each gateway 212, 214 may also be coupled to additional servers, or to additional interfaces on the same server. The gateways 212, 214 may be used to allow server 100 to access the SAN 110. In one embodiment, gateways 212, 214 may also be used to convert network communications from one protocol used to communicate with the server 100 (e.g., SCSI) to a second protocol used for communications on the SAN 110 (e.g., Fibre Channel).

Each gateway 212, 214 is also communicatively coupled to both interfaces 122, 124 of storage device 120. The communicative coupling of the gateways 212, 214 to interface 122 may be via switch 216, and the communicative coupling of the gateways 212, 214 to interface 124 may be via switch 218. By way of example, switches 216, 218 may be Brocade switches. Additional gateways may also be communicatively coupled to one or more of the switches 216, 218, and each switch 216, 218 may be communicatively coupled to additional storage devices, or to additional interfaces on the same storage device.

As can be seen from the configuration illustrated in FIG. 2, at least two redundant paths are provided from server 100 to storage device 120. In the event of failure of either interface 102, 104, or either gateway 212, 214, the path through the other interface/gateway 102/212 104/214 can be used by server 100 to access the SAN. Similarly, in the event either switch 216, 218, or interface 122, 124 of storage device 120 fails, the other switch/interface path can be used to communicate with storage device 120. Additionally, the multiple paths through the SAN 110 can be used to balance the communication load between the components of the communication path.

Figure 3:
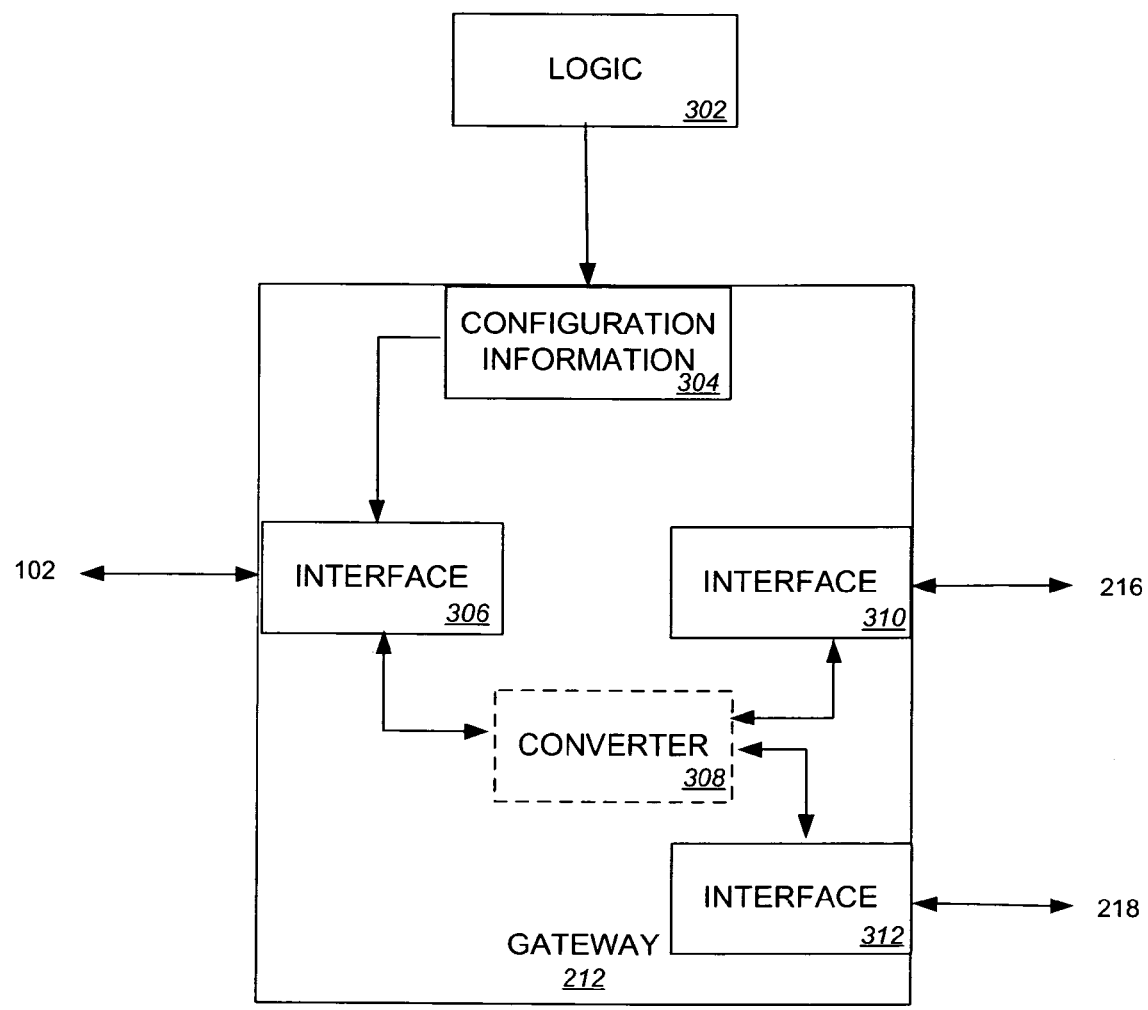
FIG. 3 illustrates an exemplary embodiment of a gateway of FIG. 2, configured using logic.

FIG. 3 illustrates an exemplary embodiment of the gateway 212 of FIG. 2, which may be configured using logic 302. Logic 302 is communicatively coupled to gateway 212. By way of example, logic 302 may be program code residing on server 100 or on another server. In an alternate embodiment, logic 302 may be firmware residing on gateway 212. As will be described in further detail below, logic 302 may be used to determine route paths through the gateway 212 for one or more addresses of interface 102. Logic 302 may also be used to configure configuration information on gateway 212 (e.g., firmware) with the route paths. It should be appreciated that logic 302 may be further coupled to gateway 214 and may also be used to set up the route paths through gateway 214 for one or more addresses of interface 104.

In addition to the configuration information, gateway 212 further comprises an interface 306 (e.g., SCSI interface) to the interface 102 of server 100. At least two interfaces 310, 312 (e.g., Fibre Channel ports) to the SAN are also included on gateway 212. Interface 310 is communicatively coupled to switch 216, and interface 312 is communicatively coupled to switch 218. In alternate embodiments, the interfaces 310, 312 may be directly communicatively coupled to an interface 122, 124 of storage device 120 or may be coupled to an interface 122, 124 of storage device 120 via additional or alternate SAN components.

By way of example, the SAN may be a Fibre Channel network, switch 216 may be coupled to a first port of gateway 212 and a first port of gateway 214, and switch 218 may be communicatively coupled to a second port of gateway 212 and a second port of gateway 214.

The gateway may route a network communication received on interface 306 from interface 102 to either interface 310 or 312. The gateway determines which interface 310, 312 to route the network communication based on the configuration information 304 configured by logic 302. In one embodiment, before forwarding the network communication, the gateway 212 may convert the communication from one network protocol to a second network protocol. By way of example, communications received on interface 306 may be converted from SCSI to Fibre Channel before being forwarded to switch 216, 218.

Figure 4:
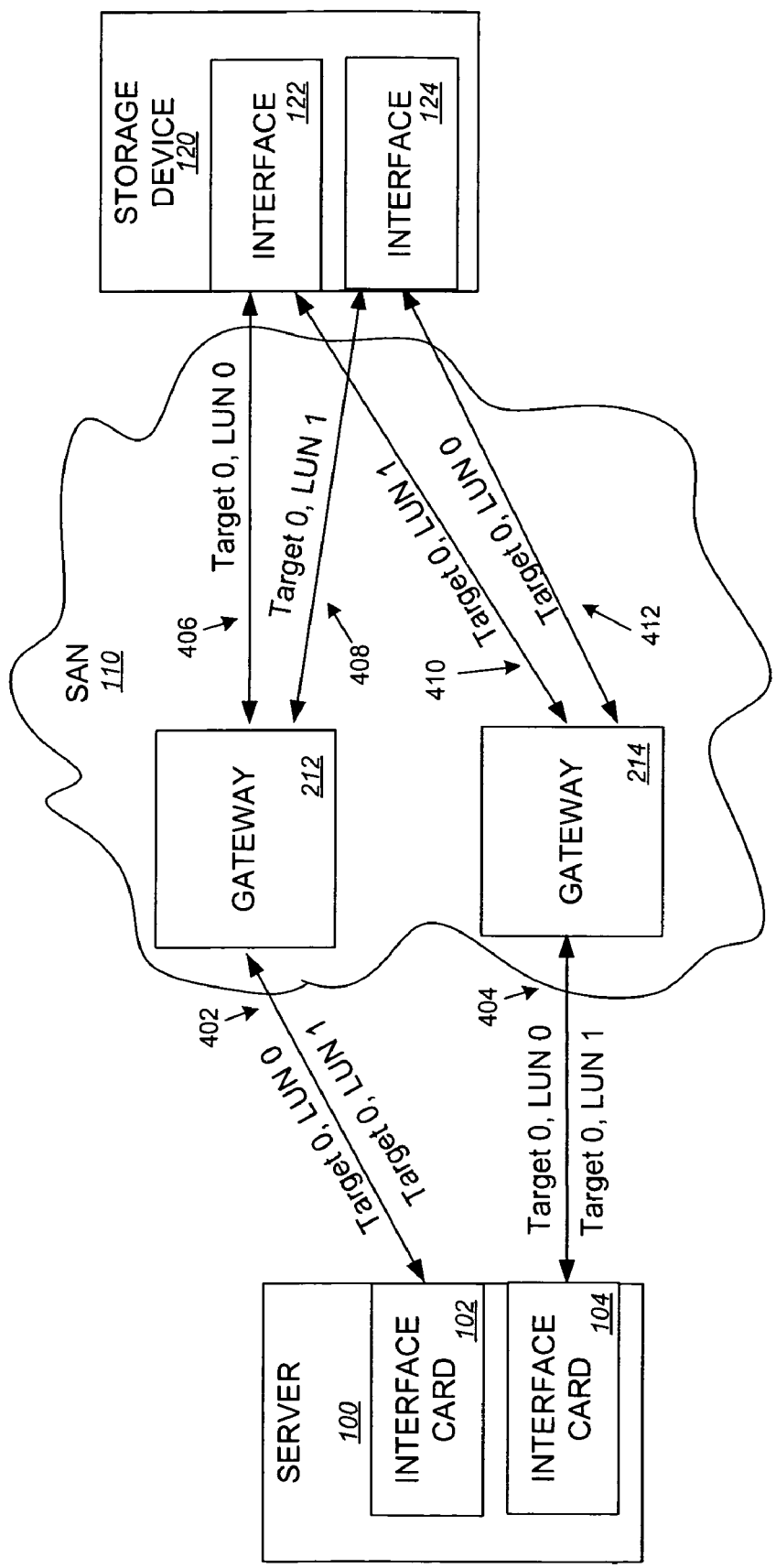
FIG. 4 illustrates an exemplary routing of network communications using the network configuration of FIG. 2.

FIG. 4 illustrates an exemplary routing of network communications using the network configuration of FIG. 2. Each interface 102, 104 may have a plurality of addresses associated with it. In one embodiment, the addresses may be SCSI addresses. Addresses of interface 102 may be routed to gateway 212 via a communicative coupling, such as a SCSI cable, and addresses of interface 104 may be routed to gateway 214.

As previously described, gateways 212, 214 may have been configured using logic 302 with the route path for each of the addresses. Depending upon the configuration, gateway 212 may route the address to either interface 122 using communicative coupling 406, or to interface 124 using communicative coupling 408. Similarly, gateway 214 may route the address to either interface 122 using communicative coupling 410, or to interface 124 using communicative coupling 412. In one embodiment, the communication couplings 406, 408, 410, 412 from gateways 212, 214 are Fibre Channel connections, and each path is connected to a port (not shown) on one of the gateways 212, 214.

In one embodiment, logic 302 may have configured gateway 212 to route the target 0, logical unit number (LUN) 0 address of interface 102 to interface 122. Gateway 212 may route the target 0, LUN 1 to interface 124. Thus, server 100 can access either interface 122, 124 of storage device 120 from both interfaces 102, 104 by using the appropriate address. Server 100 may use the redundant paths for failover recovery and/or for load balancing the communication load to and from storage device 120. It should be appreciated that logic 302 may also configure route paths through gateways 212, 214 for additional addresses of interfaces 102, 104. These additional addresses may be used to access other storage devices 120.

Figure 5:
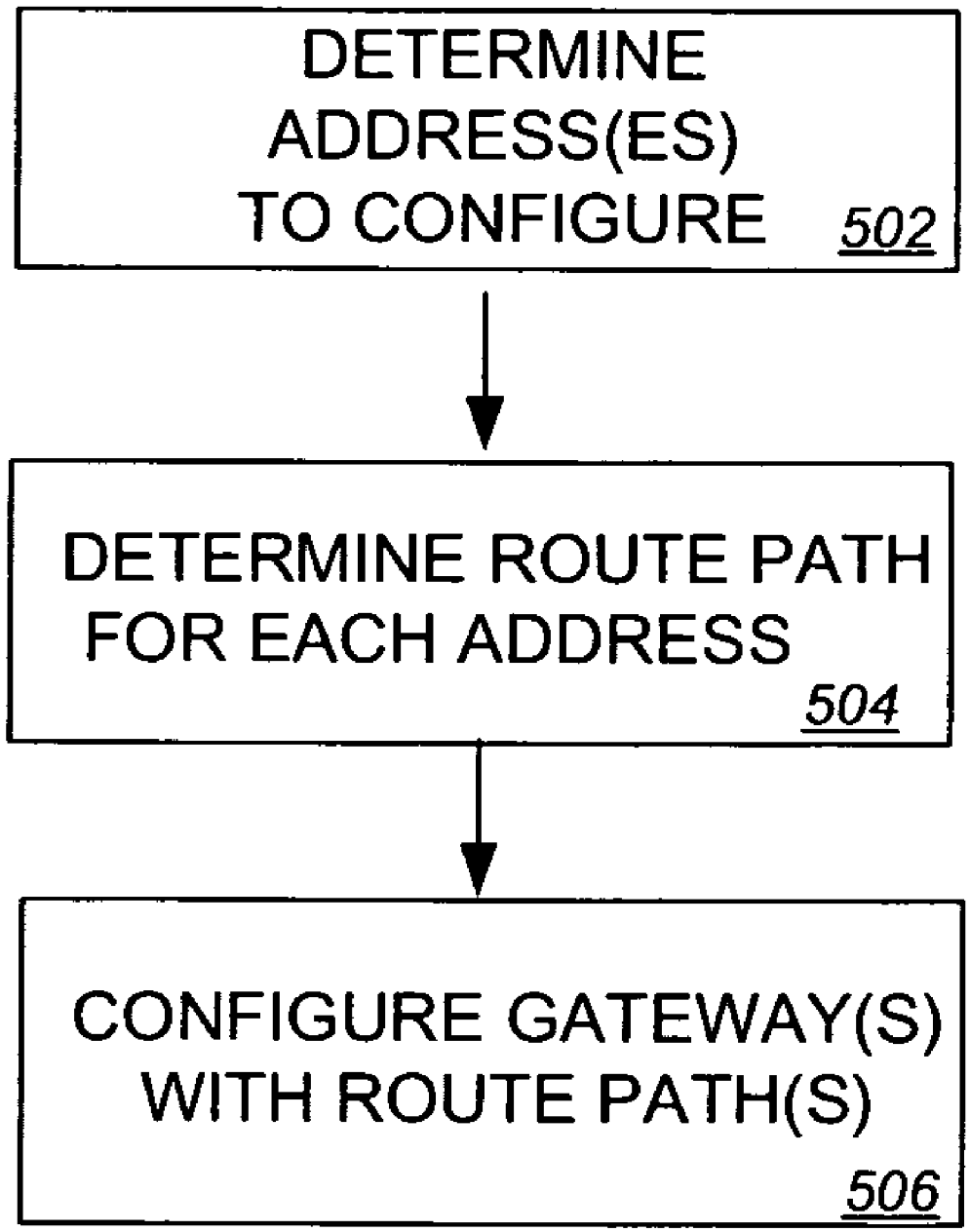
FIG. 5 is a flow diagram illustrating an exemplary method for configuring the gateway to the SAN of FIG. 2.

FIG. 5 illustrates an exemplary method for configuring gateway(s) 212, 214 to SAN 110. In one embodiment, the method is performed upon connection of a server 100 (or servers) to the gateway(s) 212, 214. In this manner, the method does not have to be worked "on the fly" (which could result in a slowing of SAN traffic).

The FIG. 5 method begins by determining 502 the addresses of one or more interfaces 102, 104 of server 100 for which route paths are to be configured. As part of the determining 502, information about the server 100 configuration may be determined. This information may include the number of interfaces 102, 104 of the server, the storage device(s) 120 to which the server 100 is to be communicatively connected, and/or the gateway(s) to which the server's interface(s) 102, 104 are connected. This information may be obtained from an administrator, the server 100, or from another source. In one embodiment, the information may then be used to determine the addresses of the interfaces 102, 104 to configure. By way of example, two addresses for an interface 102, 104 may be determined 502 for each storage device 120 to which the server 100 is to be communicatively connected.

Next, a route path is determined 504 for each address. The route path may be a route path to an interface 122, 124 of a storage device 120. The route path for each address is determined 504 by applying an algorithm to the address. In one embodiment, the addresses may be SCSI addresses. In this embodiment, an address may comprise an interface card 102, 104 number, a target number, and a logical unit number (LUN). The algorithm may then be applied to one or more of the components that make up a SCSI address.

In one embodiment, the algorithm may sum the interface card number, the target number, and the LUN for a SCSI address, and take the modulo two of the sum. This produces a result of either zero or one. Thus, the route path for the address may be set up so that a gateway 212, 214, to which the interface card 102 of the address is physically connected to routes the address to either a first interface 310 (e.g., if the result was zero) or a second interface 312 (e.g., if the result was one). Thus, route paths such as those illustrated in FIG. 4 may be determined 504. It should be appreciated that alternate embodiments may adapt the algorithm for a particular gateway configuration and that alternate algorithms may also be used.

After a route path has been determined for each address, a gateway 212, 214 to which the interface 102, 104 of the address is connected is configured with the route path. A gateway 212, 214 may be configured for each interface 102, 104 of the server 100. Additionally, the method of FIG. 5 may also be used to configure the same or different gateways with route paths for one or more interfaces of additional servers. Note that the method of FIG. 5 may be used to automatically create redundant paths for server 100 to access storage device 120. These paths may be used for failover recovery and/or for load balancing of the communication load between server 100 and storage device 120.

Note also that the method described above may be performed by hardware components or may be embodied in sequences of machine-executable instructions which may be used to cause a machine, such as a general-purpose or special-purpose processor or logic circuits programmed with the instructions, to perform the method. In one embodiment, logic 302 may comprise program code to implement the method. The method may also be performed by a combination of hardware and software. It should be appreciated that the machine-executable instructions (program code) may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions.

What is claimed is:

1. At least one machine-readable storage media comprising:
   first program code executable on a processor to determine a route path through a gateway to a storage area network for each of a plurality of addresses of an interface of a server, the first program code to determine a particular route path from the plurality of route paths by applying an algorithm to one or more numerical values associated with a particular address that is one of the plurality of addresses; and
   second program code executable on a processor to configure the gateway with the particular route path.

2. The storage media of claim 1, wherein each of the addresses comprises an interface card number, a target number, and a logical unit number (LUN) and wherein the first program code determines the route path for each of the addresses by applying the algorithm to the interface card number, the target number, and the LUN.

3. The storage media of claim 2, wherein the first program code determines the route path by summing the interface card number, the target number and the LUN, and taking a modulo of the sum.

4. The storage media of claim 2, wherein the first program code takes a modulo two of the sum.

5. The storage media of claim 4, wherein the second program code configures the gateway to route to a first interface of the gateway if the modulo two of the sum is equal to zero, and otherwise configures the gateway to route to a second interface of the gateway.

6. The storage media of claim 1, further comprising third program code executable on a processor to determine the plurality of addresses based on configuration information of the server.

7. A system comprising:
   a server including a first interface;
   a first gateway communicatively coupled to the first interface, the first gateway comprising a first gateway interface to a storage area network (SAN), a second gateway interface to the SAN, and first configuration information, the first gateway to route a network communication received from the first interface, based on the first configuration information, to one of the first gateway interface and the second gateway interface;
   logic, communicatively coupled to the first gateway, to determine a route path through the first gateway for each of a plurality of addresses of the first interface, the logic to determine a particular route path by applying an algorithm to one or more numerical values associated with the particular address from the plurality of addresses and to configure the first configuration information with the particular route path, wherein the particular route path is one of the route paths determined for the plurality of addresses; and
   a storage device comprising a first storage device interface and a second storage device interface, the first storage device interface communicatively coupled to the first gateway interface and the second storage device interface communicatively coupled to the second gateway interface.

8. The system of claim 7, wherein the server further comprises a second interface and the system further comprises:
   a second gateway, communicatively coupled to the second interface and to the logic, the second gateway comprising a third gateway interface to the SAN communicatively coupled to the first storage device interface, a fourth gateway interface to the SAN communicatively coupled to the second storage device interface, and second configuration information, the second gateway to route a network communication received from the second interface based on the second configuration information to one of the third gateway interface and the fourth gateway interface; and
   wherein the logic is further to determine a second route path through the second gateway for each of a plurality of addresses of the second interface by applying the algorithm to one or more numerical values associated with the address of the second interface, and to configure the second configuration information with the second route paths.

9. The system of claim 7, wherein each of the addresses comprises an interface card number, a target number, and a logical unit number (LUN) and wherein the logic determines the route path for each of the addresses by applying the algorithm to the interface card number, the target number, and the LUN for each of the addresses.

10. The system of claim 9, wherein the logic determines the route path for each of the addresses by summing the interface card number, the target number and the LUN, and taking the modulo two of the sum.

11. The system of claim 7, further comprising:
   a first switch, communicatively coupled between the first gateway interface and the first storage device interface, the first switch to route network communications received from the first gateway interface to the first storage device interface;
   a second switch, communicatively coupled between the second gateway interface and the second storage device interface, the second switch to route network communications received from the second gateway interface to the second storage device interface.

12. The system of claim 7, wherein the storage device comprises a disk array.

13. The system of claim 7, wherein the first gateway includes a Fibre Channel to Small Computer Systems Interface (SCSI) converter.

14. The system of claim 7, wherein the first interface is a SCSI card.

15. A method comprising:
   determining a first address of an interface of a server and a second address of the interface of the server;
   determining a first route path for the first address by applying an algorithm to one or more numerical values associated with the first address;

determining a second route path for the second address by applying the algorithm to one or more numerical values associated with the second address; and configuring a gateway between the interface and a storage area network (SAN) with the first route path and the second route path.

16. The method of claim 15, wherein determining a first route path comprises applying the algorithm to an interface card number, a target number and a logical unit number (LUN) associated with the first address.

17. The method of claim 16, wherein applying the algorithm comprises summing the interface card number, the target number and the LUN, and taking the modulo two of the sum.

18. The method of claim 15, wherein:

the first address comprises a first logical unit number of a first target of the interface and the second address comprises a second logical unit number of the first target;

determining the first route path comprises determining a route path to the first interface of a storage device; and determining the second route path comprises determining a route path to the second interface of a storage device.

19. The method of claim 15, further comprising:

receiving a third address of a second interface of the server;

determining a third route path for the third address by applying the algorithm to one or more numerical values associated with the third address; and configuring the gateway with the third route path.

20. The method of claim 15, wherein determining a first route path comprises determining an interface of the gateway to route communications received from the first address.

* * * * *

UNITED STATES PATENT AND TRADEMARK OFFICE
CERTIFICATE OF CORRECTION

PATENT NO.        : 7,346,802 B2                                          Page 1 of 1
APPLICATION NO. : 10/769371
DATED             : March 18, 2008
INVENTOR(S)       : Aland B. Adams et al.

It is certified that error appears in the above-identified patent and that said Letters Patent is hereby corrected as shown below:

In column 5, line 23, in Claim 1, after "network" insert -- (SAN) --.

In column 5, line 46, in Claim 5, delete "egual" and insert -- equal --, therefor.

Signed and Sealed this

Fifth Day of August, 2008

JON W. DUDAS
*Director of the United States Patent and Trademark Office*